United States Patent [19]

VanHoose

[11] Patent Number: 5,562,321
[45] Date of Patent: Oct. 8, 1996

[54] APPARATUS FOR PROTECTING A VEHICLE'S CARGO AREA

[76] Inventor: Jeffery J. VanHoose, 1801 Rising Star La., Edmond, Okla. 73034

[21] Appl. No.: 377,278

[22] Filed: Jan. 23, 1995

Related U.S. Application Data

[63] Continuation-in-part of Ser. No. 216,266, Mar. 23, 1994, abandoned, which is a continuation-in-part of Ser. No. 58,476, May 5, 1993, Pat. No. 5,419,602.

[51] Int. Cl.$^6$ ................................................... B62D 33/02
[52] U.S. Cl. .......................... 296/39.1; 296/37.16
[58] Field of Search ............................ 296/39.1, 37.16, 296/97.23, 146.7

[56] References Cited

U.S. PATENT DOCUMENTS

| | | | |
|---|---|---|---|
| Re. 33,200 | 4/1990 | Reynolds et al. | 296/39.1 |
| 2,898,146 | 8/1959 | Yudenfreund | 296/39 |
| 2,911,253 | 11/1959 | Dewey | 296/39 |
| 3,653,710 | 4/1972 | Barnard | 296/39 R |
| 4,420,180 | 12/1983 | Dupont et al. | 296/97.23 |
| 4,575,146 | 3/1986 | Markos | 296/39 R |
| 4,592,583 | 6/1986 | Dresen et al. | 296/39 |
| 4,693,507 | 9/1987 | Dresen et al. | 296/39 R |
| 4,850,631 | 7/1989 | Emery | 296/165 |
| 4,943,105 | 7/1990 | Kacar et al. | 296/24.2 |
| 4,958,876 | 9/1990 | Diaco et al. | 296/39.2 |
| 4,979,772 | 12/1990 | Carey et al. | 296/39.1 |
| 5,083,831 | 1/1992 | Foyen | 296/97.23 |
| 5,167,433 | 12/1992 | Ryan | 296/37.1 |
| 5,215,345 | 6/1993 | Orphan | 296/39.1 |
| 5,221,119 | 6/1993 | Emery | 296/39.2 |

FOREIGN PATENT DOCUMENTS

| | | |
|---|---|---|
| 0127141 | 5/1990 | Japan . |
| 2257666 | 1/1993 | United Kingdom . |

OTHER PUBLICATIONS

Lift Liner, For Truck Owners Only, (undated), 2 pages.
Rensi Schwedenmatte, Rensi, (undated), 2 pages.
Carl Bellinger GmbH & Co. KG, Carbox, (undated) 2 pages.
Pex, Pexbox, (undated), 3 pages.

*Primary Examiner*—Joseph D. Pape
*Attorney, Agent, or Firm*—Robert Treece

[57] ABSTRACT

An improved apparatus for protecting a vehicle's cargo area having a load locking system. The load locking system includes slots for receiving a cross member in the liner. Divider rods may be connected to cross members to further lock a load in place in the liner. The liner may include removable front and rear liner walls and the front and rear liner walls may be attachable to the vehicle. A drip ledge may be provided on the front and/or rear liner walls to direct liquid splashed thereon into the liner.

12 Claims, 4 Drawing Sheets

APPARATUS FOR PROTECTING A VEHICLE'S CARGO AREA

CROSS-REFERENCE TO RELATED APPLICATIONS

This application is a CIP of Ser. No. 08/216,266, filed Mar. 23, 1994 now abandoned which is a CIP of Ser. No. 08/058,476, filed May 5, 1993 now U.S. Pat. No. 5,419,602. Both of which are entitled "APPARATUS FOR PROTECTING VEHICLE CARGO AREA."

FIELD OF THE INVENTION

The present invention relates to an apparatus for protecting the cargo area of vehicles

SUMMARY OF THE INVENTION

In my prior applications, U.S. Ser. No. 08/058,476 filed May 5, 1993, titled APPARATUS FOR PROTECTING VEHICLE CARGO AREA and U.S. Ser. No. 08/216,266, filed Mar. 23, 1994, also titled APPARATUS FOR PROTECTING VEHICLE CARGO AREA (both of which are specifically incorporated herein by reference), I described and claimed a liner for vehicles. The present invention is an improved apparatus for protecting a vehicle's cargo area.

The current invention includes an improved load locking system, two tiered loading and removable panels for improved versatility. It has been found that the ability to lock a load in place, where it will not slide around in the liner, and the ability to separate the liner into upper and lower tiers, is a highly advantageous configuration. The present invention not only provides both two tiered loading and load locking, but also provides a stronger, more versatile apparatus for accomplishing these objectives. All this is accomplished without requiring support from the vehicle's cargo area sidewalls.

The load locking capabilities of the current invention provide for fore and aft article locking, as well as left/right locking. The load locking improvements are also adapted to provide for strong and efficient two tiered loading.

The present invention also provides greater versatility in that it utilizes a short or removable front liner wall. This is especially advantageous when a liner is used in the shorter cargo area of a mini van, jeep or similar vehicle, when the operator generally wishes to leave the rear seat in position for transporting passengers. With the short or removable front liner wall, the smaller cargo area is protected, and when it is desirable to fold or remove the rear seat, articles may be placed in the liner, so that they extend forward beyond the liner. In one preferred embodiment the front and rear liner walls are tall enough to prevent liquid spilt in the liner from escaping, but is short enough to allow large quantities of longer articles to be placed in the liner and to extend forward into the area normally occupied by the rear seat.

DETAILED DESCRIPTION OF THE PREFERRED EMBODIMENTS

Figure 1:
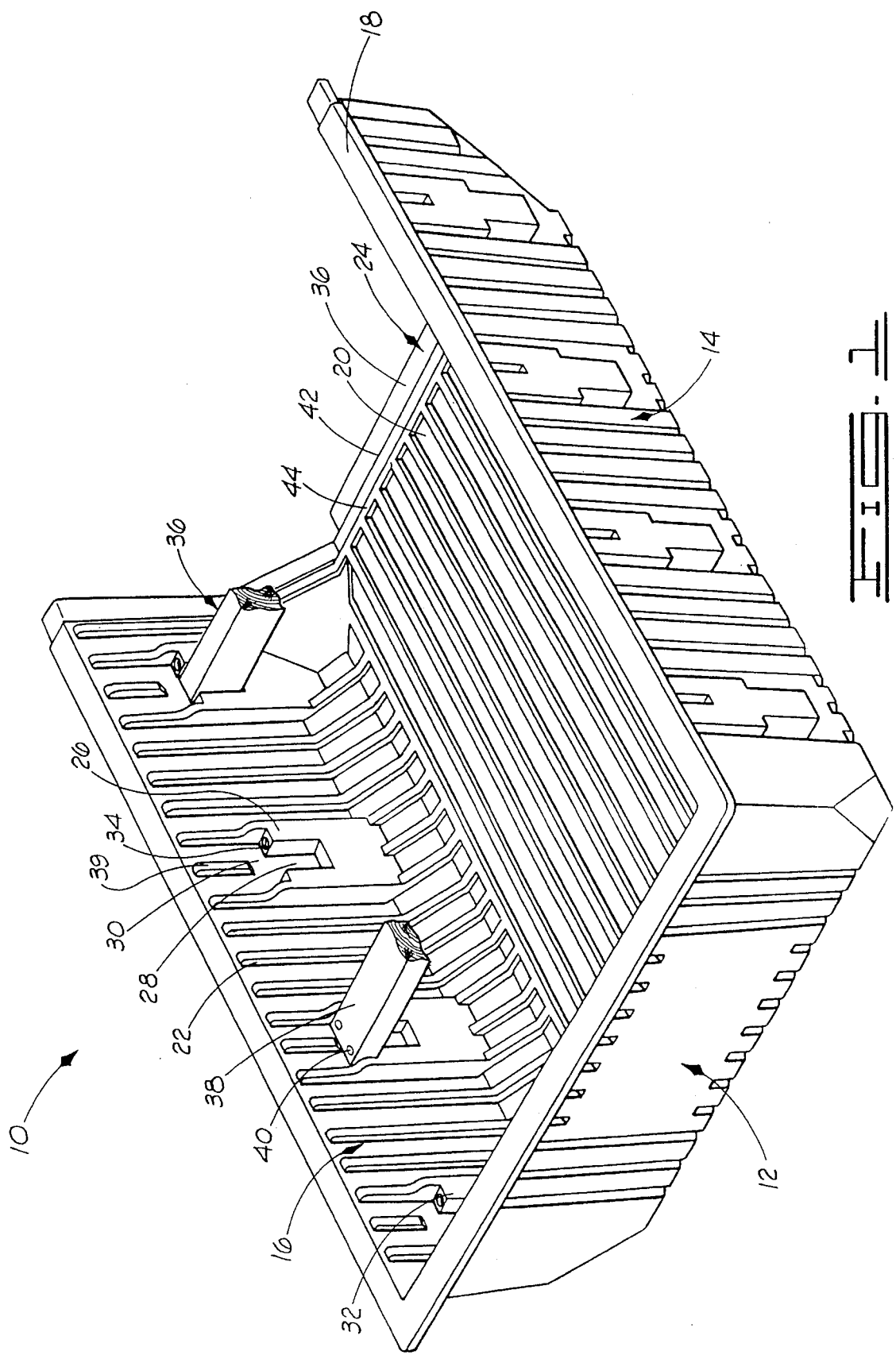
FIG. 1 is a perspective view of a liner constructed in accordance with the present invention.

Referring to the drawings in detail, and FIG. 1 in particular, reference character 10 designates a liner constructed in accordance with the present invention. The liner 10 has a front panel 12, a left side panel 14, a right side panel 16, and a bottom 20. Preferably, the left side panel 14 and the right side panel 16 are integral with the bottom and extend generally upwardly therefrom. In the preferred embodiment the front panel 12 is also integral with the bottom 20 and extends generally upward therefrom, however, as will be explained in more detail below, the front panel 12 may be partially or completely removable. A removable rear panel (not shown) may also be provided at or near the rear 24 of the bottom 20. Stiffening ribs 22 may also be provided to further strengthen the liner 10.

To provide load locking capabilities, preferably the liner 10 includes a series of protrusions or indentations which may be used to lock a load into place. For example, FIG. 1 discloses a load locking protrusion 26, hereinafter referred to as the "T-Lock". Preferably the T-Lock 26 includes a vertical slot 28 having stanchions on either side thereof to form a horizontal slot 30. In this way the T-Lock can support a vertical cross member 36, such as a two-by-four, or similar member, and a horizontal cross member 38, which may also be a two-by-four, or similar member. As is shown in FIG. 1, a plurality of T-Locks 26 may be provided along the right side panel 16 with corresponding T-Locks on the left side panel 14. Preferably the T-Locks on the left side panel 14 and the right side panel 16 are spaced at an equal distance from the front 12 of the liner. In this way, vertical and horizontal cross members may matingly engage with the respective vertical and horizontal slots on the right side panel 16 and the left side panel 14 providing a load locking system.

A locking rib 39 may be provided to add structural integrity to the side panels, 14 and/or 16, as well as to lock or hold in a cross member, such as horizontal cross member 38, when it is placed in mating engagement with the horizontal slot 30. Preferably the cross members are of sufficient length to be supported in either the vertical slot 24 or by the stanchions on either side of the horizontal slot, but not so long so as to distort the left or right sidewall 14 or 16. It should be noted that the liner of the current invention is designed so that the sidewalls are self-supporting in that they do not require support from the sides of the cargo area of the vehicle in which they are placed, however the T-Lock 26 may also be incorporated in other types of liners such as pickup bed liners, wherein the sidewalls receive support from the pickup bed sidewalls.

The stanchions on either side of horizontal slot 30 may also have dowel holes or apertures 34. In this way, a horizontal cross-member may have pins or dowels, such as dowel 40, which extend through the apertures 34 to increase the structural integrity of the liner 10 when hauling heavy loads. This is particularly useful when such loads are above the horizontal cross member in a two tiered loading style. To increase the number and type of articles which may be hauled in the liner 10 on the second tier, or the upper portion, a shelf (not shown), such as a piece of plywood may be laid across the upper sides of the horizontal or vertical cross members. In this way, materials may be stacked on the shelf providing an upper layer for hauling materials as well as a lower layer below the cross members, on the bottom 20, for hauling materials.

Articles placed in the liner 10 may be lashed, clipped, tied, or otherwise secured to a cross member 36 or 40 to hold the article in place when the vehicle is moving. Additionally, an article may be pinned or confined to a specific portion of the liner 10 by placing the article between the front and a cross member, between two cross members, between the rear lip 42 and a cross member or if provided between the removable rear panel (not shown) and a cross member.

Figure 2:
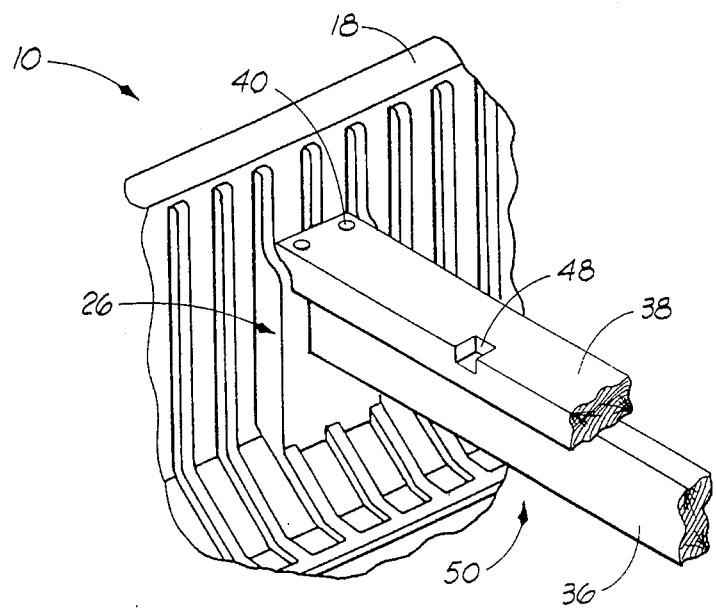
FIG. 2 is an enlarged portion of the liner of FIG. 1.

Referring now to FIG. 2. An enlarged T-Lock 26 is shown, having both a horizontal cross member 38 and a vertical cross member 36. When two members are used in this T configuration, the hauling capacity of the upper tier is dramatically increased. Note that even with the rigidity provided by rolled edge 18, when extremely heavy loads are hauled, it is preferable to include dowel pins, such as dowel pins 40, to tie the horizontal cross member to the side wall of the liner 10.

Figure 3:
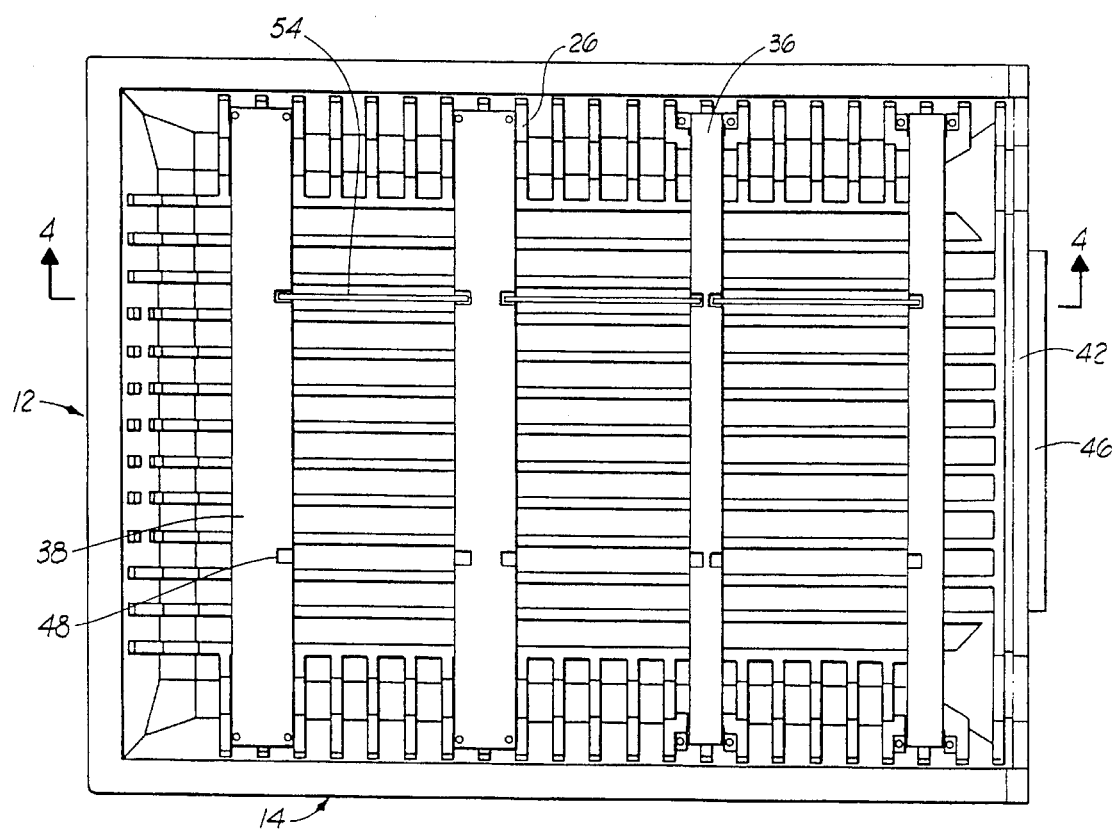
FIG. 3 is a top plan view of the present invention showing some possible configurations for the load locking system for the present invention.

FIG. 3 shows how the load locking system of the present invention may be utilized, not only to prevent loads from shifting forward or toward the rear of the liner, but may also be used to prevent loads from shifting from one side to the other of the liner. FIG. 3 shows notches in cross members such as notches 48 (only one notch 48 being designated herein), a plurality of notches or pins may be used to secure a divider such as divider 54 along various locations between cross members. Suitable dividers include rods, bars, tubes, boards, and other rigid or semi-rigid items. While FIG. 3 shows only 2 dividers, a front divider placed between two horizontal cross members and a rear divider placed between two vertical cross members. It should be understood that any number of dividers may be used. The number of dividers being limited only by the number of notches which may be placed in any cross member. As mentioned before, and emphasized here, the dividers may be held by means other than notches, for example, a series of pins along a cross member could serve to hold dividers in place.

Also shown in FIG. 3 is a carpet strip 46. The carpet strip may be used to extend under the vehicles door threshold to reduce the likelihood that the liner will slide inside the cargo area.

Figure 4:
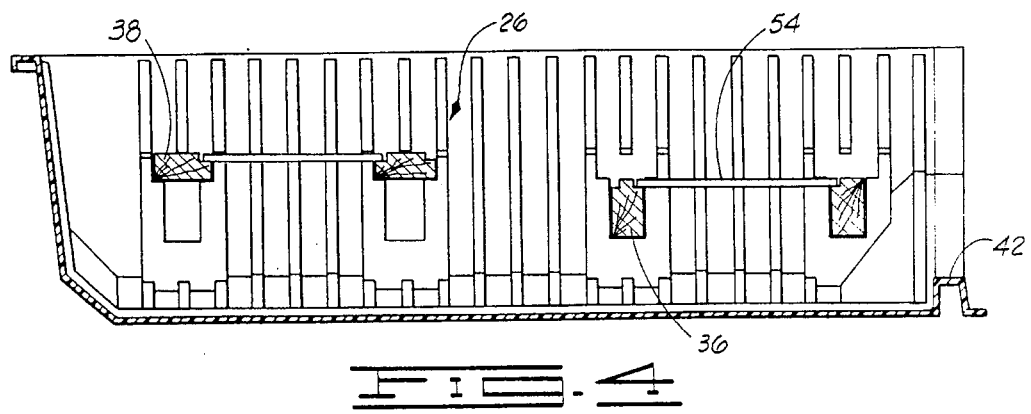
FIG. 4 is a cross sectional view of the liner of FIG. 3 along line 4—4.
Figure 5:
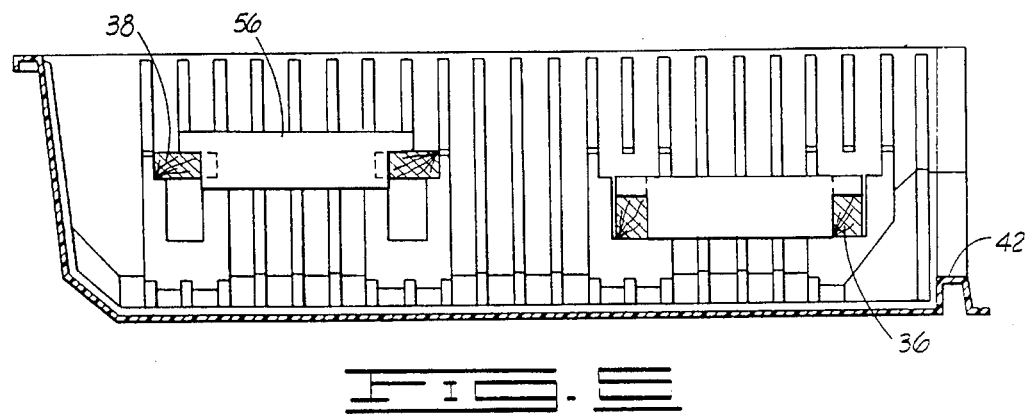
FIG. 5 is a cross section of the liner of FIG. 3 along line 4—4 showing an alternate configuration for the load locking system for the current invention.

FIGS. 4 & 5 shows another type of divider which may be used with the liner of the current invention. In this embodiment, divider beams 56 are secured between either horizontal or vertical cross members. Preferably the divider beams 56 are cut to a length and notched so that the same divider beam 56 may be used between either horizontal cross members or vertical cross members, as is shown in FIG. 5. It should be noted that even though a divider beam 56 would not be completely horizontal, that is, it would be tilted, it could still be used between an horizontal member and a vertical member to secure a load.

While rigid or semi-rigid dividers 54 are preferred, ropes, elastic bands, bungi cords or other flexible dividers may be used. This type of a divider may be fastened to the cross-member by wrapping or tieing to the cross member, but it is preferable to provide holes, loops, eyebolts, pins, or similar fastening means from them to attach to.

Figure 6:
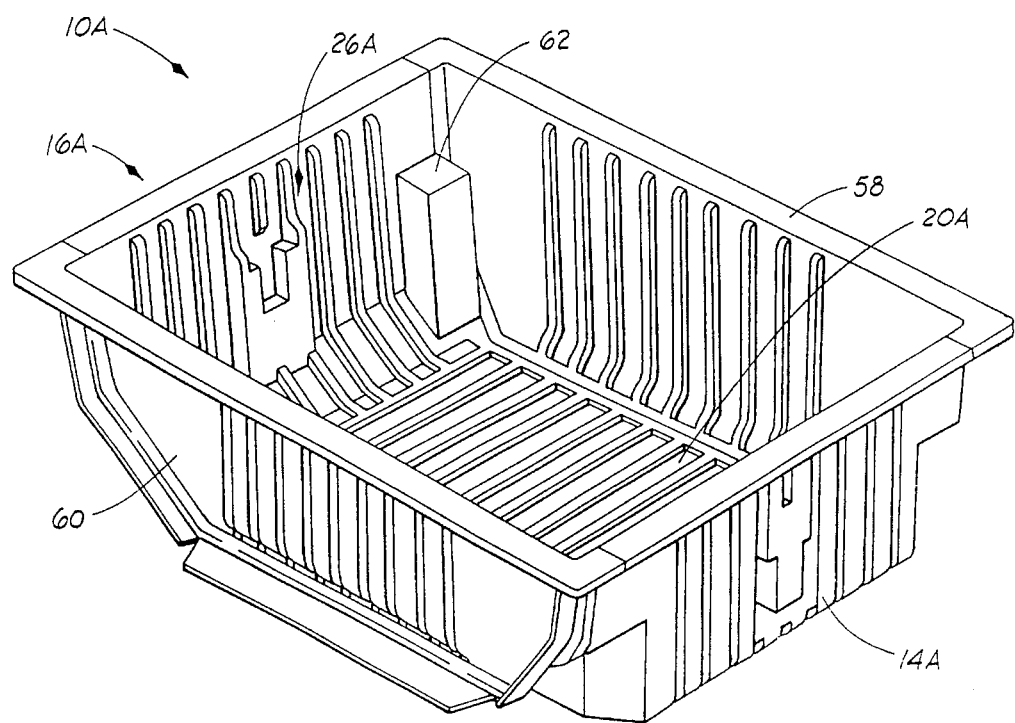
FIG. 6 is a perspective view of another embodiment of the current invention.

FIG. 6 shows the liner of the current invention with a different configuration for the two tiered loading. The liner 10A has stanchions 62 along the left and right sidewalls 14A and 16A, of the liner 10A. The stanchions 62 may be used to support a shelf for two tiered loading. Additionally the liner 10A may include one or more pairs of T-Locks, 26A, for additional support for two tiered loading or for load locking an item in the liner 10A.

The liner 10A may also include a front panel 60 which is all or partially removable. The front panel 60 may be attached in a manner similar to the removable rear panel 58. It should be noted that at a minimum one or more lips, such as lips 42 and 70 shown in FIG. 7, should be provided on the front and/or the rear to contain liquids on the bottom 20A of the liner 10A. Preferably, however, only a portion of the front panel 60 is removable, in this way the remaining portion of the front panel 60 is integral with the right side 16A, the bottom 20A, and the left side 14A to provide additional structural integrity.

Figure 7:
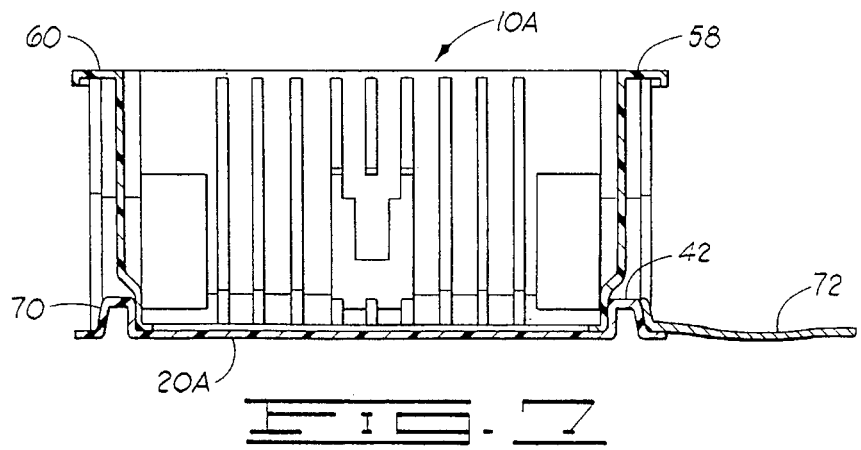
FIG. 7 is a cross sectional view of the liner of FIG. 6.

A flexible material may be attached to the rear of the liner such as fabric strip 72 shown in FIG. 7. Preferably the material should be flexible so it may be rolled up or folded back to close the rear door(s). Alternatively the material should thin enough and flexible enough to conform with the door sill so the rear door(s) may be closed over the material.

Figure 8:
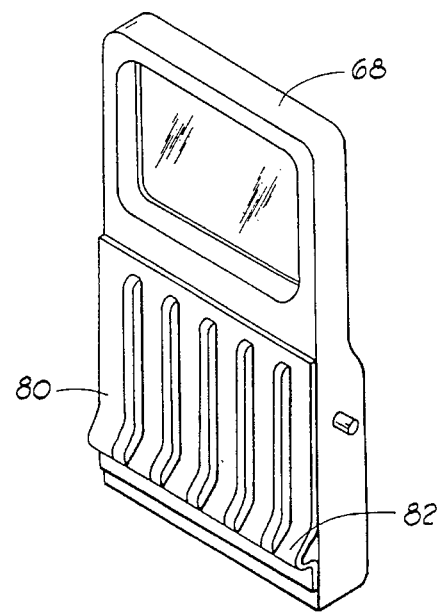
FIG. 8 is a perspective of a rear panel attached to the rear door of the vehicle's cargo area.
Figure 9:
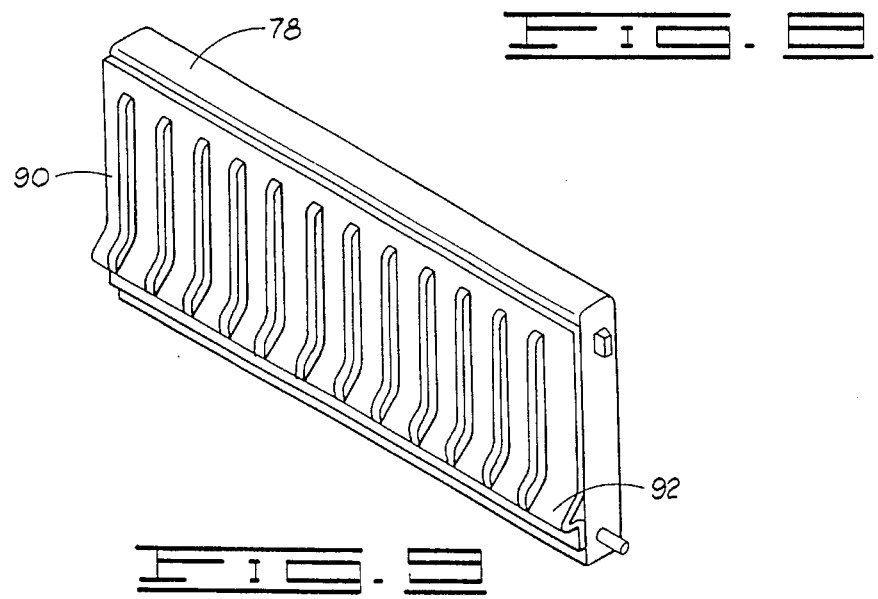
FIG. 9 is a perspective of another rear panel attached to the rear door of a vehicle's cargo area.

One or more panels, such as rear panels 80 and 90 shown in FIGS. 8 and 9, may be provided for attachment to the rear door(s) 68 of the vehicle or behind the rear seat of the vehicle. A panel may be fastened to the vehicle's rear door(s) or seat by screwing, riveting, velcrowing, shaping or other similar means. When a panel is attached to the rear side of the rear seat of a vehicle it provides a front for the liner when the seat is in the raised position and also provides protection for the floor of the cargo area when the seat is folded down.

Preferably the panel attached to the rear seat or rear doors include a drip ledge such as ledges 82 and 92 shown in FIGS. 8 and 9. The drip ledge may be any configuration so long as it extends over the liner bottom. In this way, when the seat is raised, or the doors are closed, any liquid splashed on the panel will drip onto the bottom of the liner and be contained therein.

Changes may be made in the combinations, operations, and arrangements in the various parts and elements described herein without departing from the spirit and scope of the invention as defined in the following claims:

I claim:

1. A liner for use in the rear cargo area of a vehicle, the cargo area having a floor, at least a partial front formed by a seat, left and right sides, and a rear formed by at least one door, wherein the liner comprises:

a generally shape sustaining bottom conforming generally to the shape of the floor, wherein the bottom has a front edge, a left edge, a right edge and a rear edge;

a generally shape sustaining right liner wall integral with the bottom and extending generally upward therefrom;

a generally shape sustaining left liner wall integral with the bottom and extending generally upward therefrom;

one or more rear panels for attachment to the at least one door of the vehicle to protect said at least one door, wherein the one or more rear panels have a drip ledge formed therein which extends over the liner when said at least one door of the vehicle is in a closed position.

2. The liner of claim 1 further comprising:

one or more front panels for attachment to the seat of the vehicle to protect said seat, wherein said one or more front panels have a drip ledge formed therein which extends over the liner when the seat is in a passenger carrying configuration.

3. A liner for use in the rear cargo area of a vehicle, the cargo area having a floor, at least a partial front formed by a seat, left and right sides, and a rear formed by at least one door, wherein the liner comprises:

a generally shape sustaining bottom conforming generally to the shape of the floor, wherein the bottom has a front edge, a left edge, a right edge and a rear edge;

a generally shape sustaining right liner wall integral with the bottom and extending generally upward therefrom;

a generally shape sustaining left liner wall integral with the bottom and extending generally upward therefrom;

one or more front panels for attachment to the seat of the vehicle to protect said seat, wherein said one or more front panels have a drip ledge formed therein which extends over the liner when the seat is in a passenger carrying configuration.

4. The liner of claim 1, further comprising: one or more slots formed in each sidewall for receiving and supporting one or more cross-members between said sidewalls.

5. The liner of claim 4 wherein said slots are vertical slots having stanchions on either side thereof to form horizontal slots above the vertical slots.

6. The liner of claim 5 wherein said horizontal and vertical slots form a T shape.

7. The liner of claim 1, further comprising: one or more lips on the rear of the bottom to contain liquids on the bottom.

8. The liner of claim 3, further comprising: one or more slots formed in each sidewall for receiving and supporting one or more cross-members between said sidewalls.

9. The liner of claim 8 wherein said slots are vertical slots having stanchions on either side thereof to form horizontal slots above the vertical slots.

10. The liner of claim 9 wherein said horizontal and vertical slots form a T shape.

11. The liner of claim 3, further comprising: one or more lips on the rear of the bottom to contain liquids on the bottom.

12. The liner of claim 3, further comprising: at least one lip on the front of said bottom to contain liquids on the bottom.

* * * * *